(12) United States Patent
Ancona et al.

(10) Patent No.: US 6,343,546 B2
(45) Date of Patent: Feb. 5, 2002

(54) ELECTRIC SALAD SPINNER

(75) Inventors: Bruce Ancona; Robert A. Varakian, both of Chicago, IL (US)

(73) Assignee: Lectrix, LLC, Edgewater, NJ (US)

( * ) Notice: Subject to any disclaimer, the term of this patent is extended or adjusted under 35 U.S.C. 154(b) by 43 days.

(21) Appl. No.: 09/810,115

(22) Filed: Mar. 16, 2001

Related U.S. Application Data

(60) Provisional application No. 60/193,635, filed on Mar. 31, 2000.

(51) Int. Cl.[7] .......................... A47J 37/10; A47J 43/04; F26B 17/24; F26B 17/30
(52) U.S. Cl. .............................. 99/495; 34/58; 99/511; 210/360.1; 494/60; 494/84
(58) Field of Search .......................... 99/495, 511–513, 99/516, 479, 485; 34/8, 58; 210/360.1, 380.1, 781, 784; 494/11, 37, 46, 60, 62, 63, 84; 241/282.1, 37.5, 92; 426/443, 478, 601; 366/234, 601

(56) References Cited

U.S. PATENT DOCUMENTS

| | | | | |
|---|---|---|---|---|
| 3,753,297 A | * | 8/1973 | Mantelet | 34/58 |
| 3,885,321 A | * | 5/1975 | Fouineteau | 210/360.1 |
| 4,007,751 A | * | 2/1977 | Commiant | 34/58 |
| 4,103,432 A | * | 8/1978 | Dieterich et al. | 366/274 X |
| 4,114,286 A | * | 9/1978 | Bingham | 99/495 X |
| 4,189,850 A | * | 2/1980 | Dieterich et al. | 34/58 |
| D260,346 S | * | 8/1981 | Lebowitz | D7/665 |
| 4,702,162 A | * | 10/1987 | Sontheimer et al. | 99/511 X |
| 5,010,805 A | | 4/1991 | Ferrara | |
| 5,064,535 A | * | 11/1991 | Hsu | 210/380.1 |
| 5,156,084 A | | 10/1992 | Lin | |
| 5,317,964 A | * | 6/1994 | Prudhomme | 99/495 |
| 5,445,070 A | | 8/1995 | Rebel | |
| 5,562,025 A | * | 10/1996 | Bull et al. | 99/495 |
| D376,063 S | * | 12/1996 | Bull et al. | D7/668 |
| 5,611,265 A | * | 3/1997 | Ronci et al. | 99/410 X |
| 5,819,641 A | | 10/1998 | Hsu | |

* cited by examiner

*Primary Examiner*—Timothy F. Simone
(74) *Attorney, Agent, or Firm*—Cowan, Liebowitz & Latman, P.C.

(57) ABSTRACT

An electric salad spinner device which is designed for ease of use and allows for efficient drying of salad greens, leafy vegetables and the like. The device comprises a base component, a generally cylindrical basket component, a generally cylindrical basket component, a scalable lid having a handle, an on/off switch and a drive motor. Optionally, the device also comprises a liquid dispenser assembly which may also be motorized to provide agitation and may also comprise a sheer assembly to allow for slicing in of hard vegetables such as, for example, cucumbers, carrots, celery and the like.

6 Claims, 4 Drawing Sheets

ELECTRIC SALAD SPINNER

RELATED APPLICATION

This application claims the benefit of U.S. Provisional Application 60/193,635, filed Mar. 31, 2000.

FIELD OF THE INVENTION

The present invention relates generally to kitchen appliances and more, particularly, to an electric salad spinner device, which is designed for ease of use and provides the user with a more efficient way of carrying out the drying of wet salad greens, leafy vegetables, and the like, as well as to provide various optional functions as desired by the user.

BACKGROUND OF THE INVENTION

While a variety of salad spinners are known in the art, none are available which provide the user with the case and simplicity of an electric motor-driven device, such as is the subject of the present invention. Also, while numerous food processor devices exist, which are electrically driven, none provides the user with the benefits afforded by a conventional hand-operated salad spinner.

A number of prior art references are available in the art, each of which references is directed to some specific discreet elements of the device which is described and claimed in the present invention. However, none of the references is directed to the totality of the combination, or its use and function in the manner described and claimed herein.

The following prior art references are known:

Hsu, U.S. Pat. No. 5,819,641 discloses an electrically-operated multi-functional processing machine capable of various functions, such as soy bean, rice and coffee milling as well as pressing and mixing juice and cutting slices;

Rebel, U.S. Pat. No. 5,445,070 discloses an electrically-operated food processor capable of cutting, stirring, kneading and centrifuging;

Lin, U.S. Pat. No. 5,156,084 discloses a crank-operated food processor having a work basket, a food processing member, and a seasoning aperture for dispensing seasoning and/or vegetable oils into the work bowl. The food processing member can comprise a drainer basket, a slicer member, or a mixing element;

Ferrera, U.S. Pat. No. 5,010,805 discloses a potato chip maker including an apparatus for centrifugally removing cooking oil from any product. The device includes a slicer mechanism for slicing potatoes and other vegetables, fish, chicken, etc., inserted through an opening, and a basket for centrifugally extracting liquid from the contents of the basket; and Sontheimer et al., U.S. Pat. No. 4,702,162 discloses an electrically-driven salad spinner, which is an attachment for an existing food processor;

OBJECTS OF THE INVENTION

It is therefore an object of the invention to provide an electric salad spinner which provides the user with a device which requires less effort to use than conventional, manually operated salad spinner.

It is also an object of the present invention to provide an electric salad spinner which affords the user a more efficient manner of carrying out the drying of wet salad greens, leafy vegetables and the like.

It is a further object of the present invention to provide an electric salad spinner which provides the user with various optional functions to allow such user to enhance the salad greens or other leafy vegetables which are being dried by adding additional components such as salad dressings, oils, vinegars and similar items.

These and other objects of the invention will become more apparent from the discussion below.

SUMMARY OF THE INVENTION

The present invention provides for an electric salad spinner device which is designed for ease of use and provides the user with a more efficient way of carrying out the drying of wet salad greens, leafy vegetables and the like. Further, the electric salad spinner device of the present invention provides the user with a variety of optional functions which allow the user to enhance the salad or other leafy greens which are being prepared, for example, by the addition of salad dressings, oils, vinegars, and similar liquids, or by slicing in other hard vegetables such as, for example, carrots, celery and radishes.

The construction and obvious advantages of the device provided for by the present invention will be more clearly understood from the following description of the various specific embodiments when read in conjunction with the accompanying drawings.

BRIEF DESCRIPTION OF THE DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

The present invention is directed to an electric salad spinner device which is designed for case of use and provides the user with a more efficient manner of carrying out the task of drying wet salad greens, leafy vegetables and the like. In its most preferred embodiment the electric salad spinner device of the present invention comprises a generally cylindrical base component having an open top and a closed bottom, in which is inserted a mating, generally cylindrical open top basket component having drainage holes throughout the surface thereof, the open top of the base component being fitted with a sealable lid component. The salad spinner is provided with a handle assembly having a motorized drive assembly extending therethrough such that a drive shaft/gear means of the drive assembly slidingly engages the top of the cylindrical basket to enable rotation of the cylindrical basket about its axis when the electric motor is activated by the user depressing a switch located in the handle assembly. Optionally, vegetables can be sliced into the basket and/or salad dressing or the like can be added mechanically.

Figure 1:
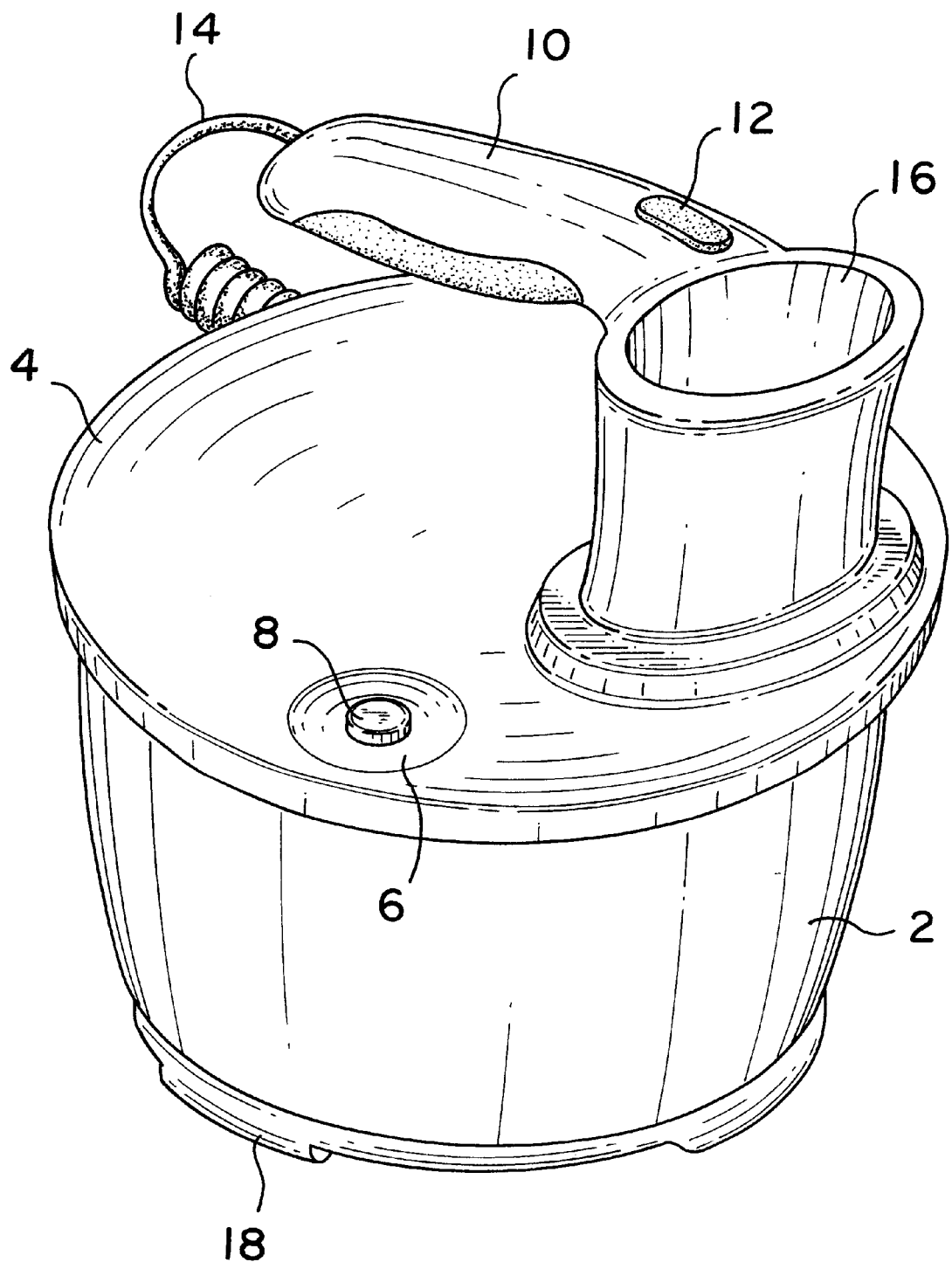
FIG. 1 is a front perspective view of an embodiment of the electric salad spinner device of the present invention.

The invention can perhaps be better appreciated from the drawings. In FIG. 1, which is a front perspective view of an embodiment of the electric salad spinner device of the present invention, a generally cylindrical base component 2 is depicted with the sealable lid 4 affixed in the engaged position. Port 6 is shown in its closed position with a scaling closure 8, which sealing closure 8 is removable for the addition of liquids.

Affixed to the top of scalable lid 4 is a handle assembly 10, having an on-off switch 12, through which handle assembly 10 passes an electrical supply cord 14 which in turn supplies electricity to a drive motor. Hard vegetables or other food items to be sliced by an optional slicing blade assembly, can be inserted into cylindrical opening 16. Base component 2 is provided with three or more rubberized feet 18 around the circumference of the bottom edge thereof.

Figure 2:
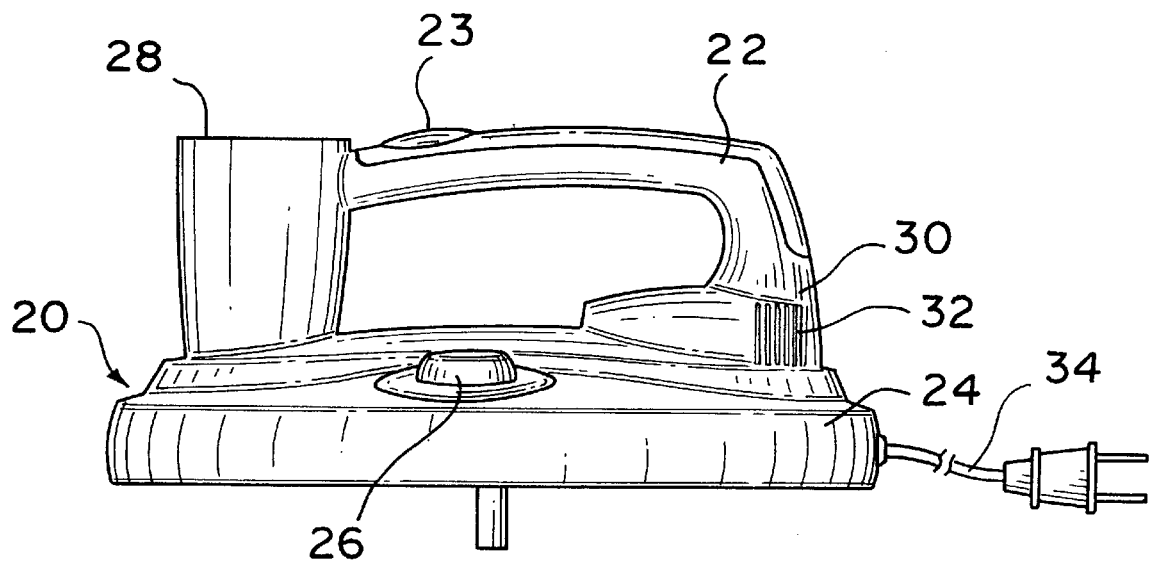
FIG. 2 is a lateral view of the top section of another embodiment of the electric salad spinner device of the present invention.
Figure 3:
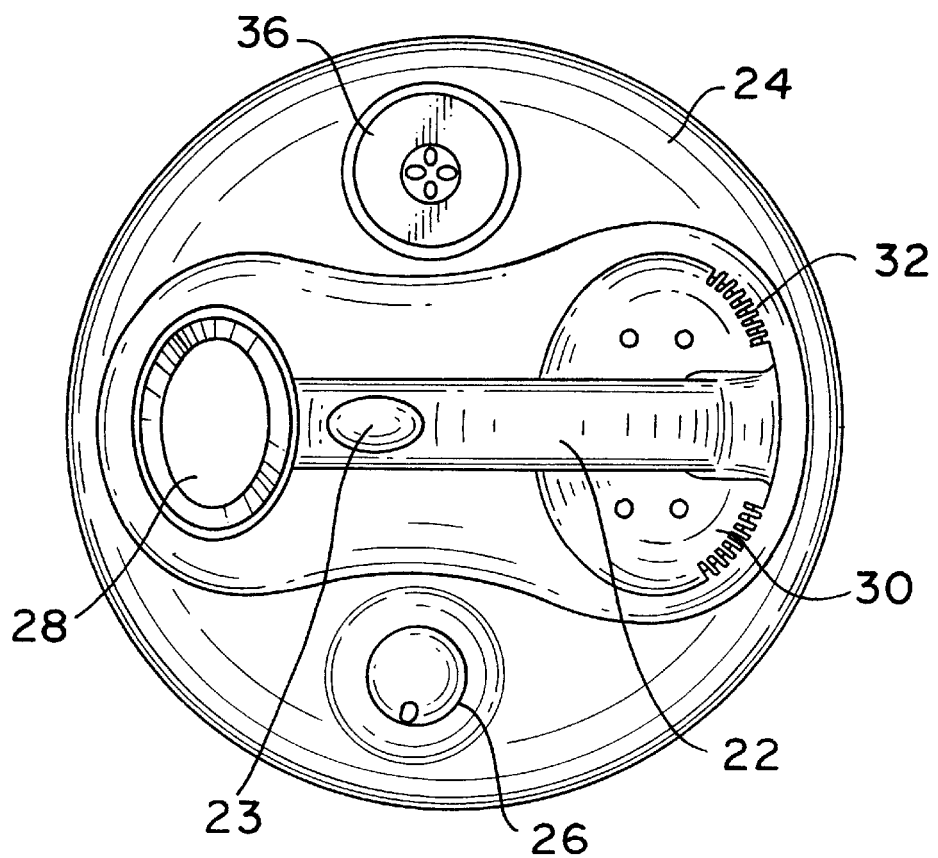
FIG. 3 is a top view of the top section shown in FIG. 2.

In FIGS. 2 and 3 the top portion 20 of another embodiment of the invention comprises a handle assembly 22 positioned atop a cover section 24. An on-off switch 23 is located at the upper surface of handle assembly 22, and a speed selector knob 26 is located on the upper surface of cover section 24. The upper surface of cover section 24 also comprises a receptable 36 to mount a salad dressing vessel. Handle assembly 22 comprises an opening 28 to insert vegetables and the like. Opposite of opening 28 handle assembly 22 comprises motor housing 30 having vents 32. An electric cord 34 extends from cover section 24.

Figure 4:
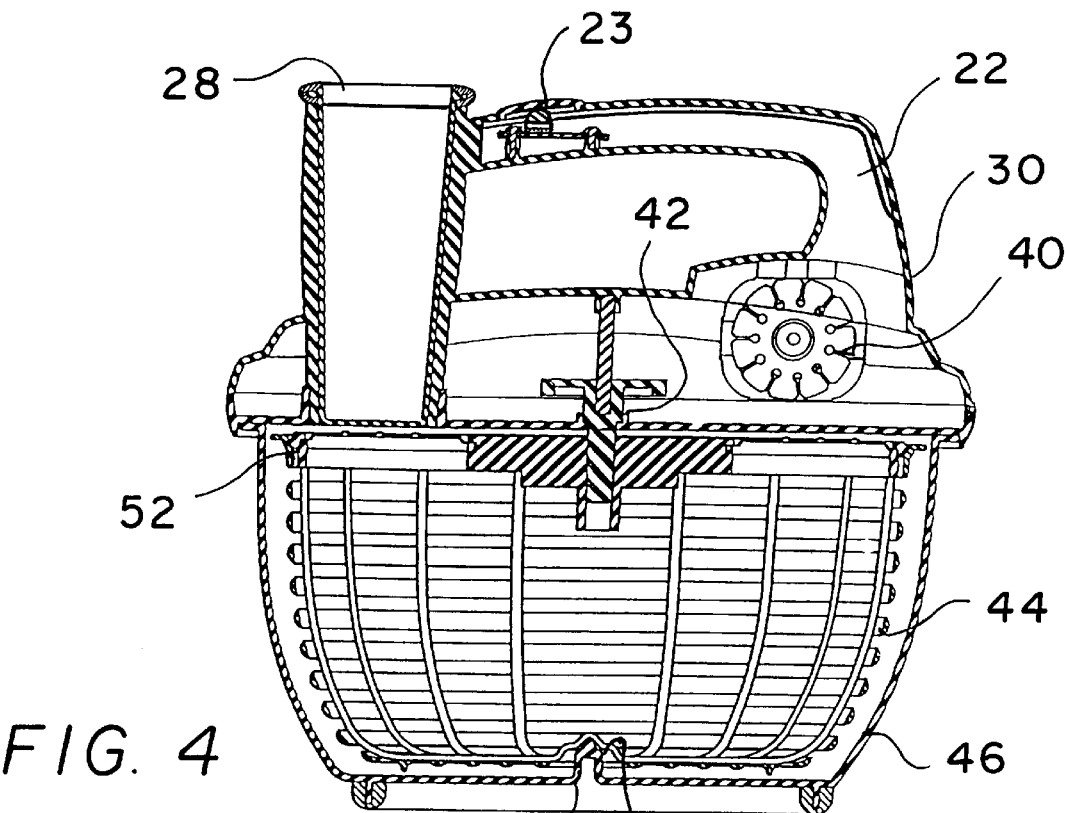
FIGS. 4 and 5 are each a lateral cross-sectional view of the embodiment of the invention shown in FIGS. 2 and 3.
Figure 5:
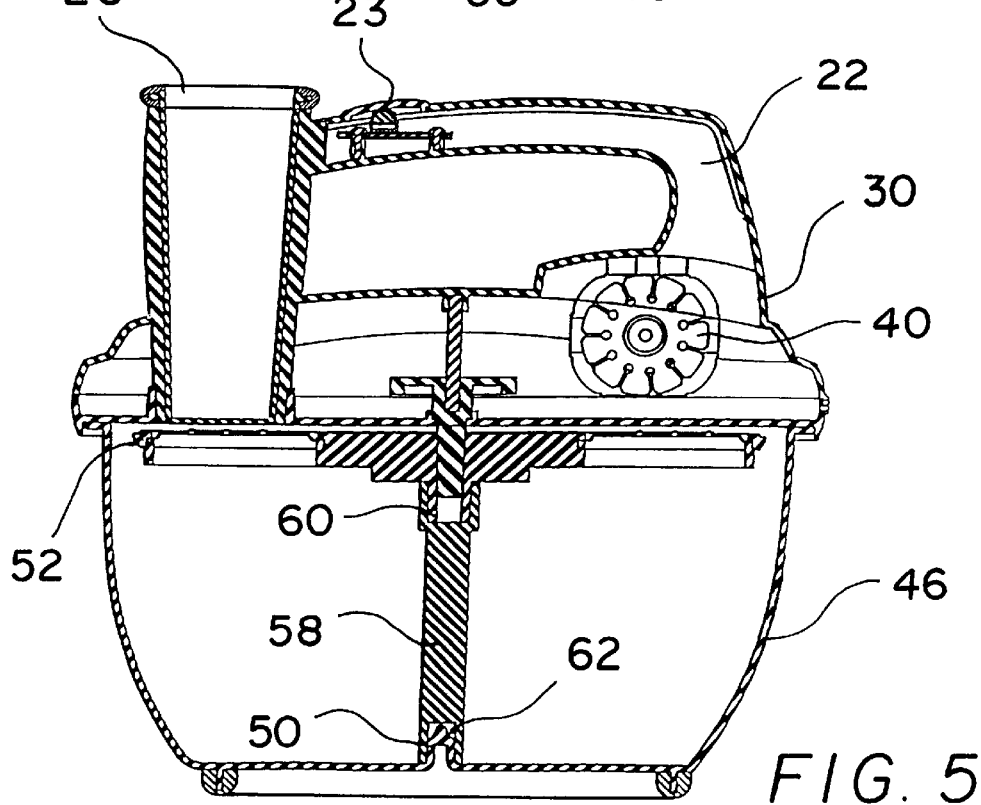

Alternative configurations of an embodiment of the invention are shown in FIGS. 4 and 5. In FIG. 4, motor housing 30 in handle assembly 22 houses a motor 40 that is operatively connected, preferably by one or more gears, to a drive shaft 42. A perforated salad spinner 44 is rotably positioned within bottom section 46, wherein salad spinner 44 has an indentation 48 that cooperates with a protrusion 50. Salad spinner 44 has holes or perforations to allow water or other liquids to pass through when salad spinner 44 is rotated.

A cover lid 52 is removably and sealingly attached to the upper surface of salad spinner 44. Cover lid 52 has a relatively thicker midsection 54 that engages drive shaft 42.

Cover lid 44 52 can contain slicing or cutting means for vegetables, for example, as described below. When it is desired to use cover lid 52 without salad spinner 44, a support rod 58 can be used to support cover lid 52, as shown in FIG. 5. Support rod 58 has one cavity 60 that engages drive shaft 42 and another cavity 62 that engages protrusion 50.

Figure 6A:
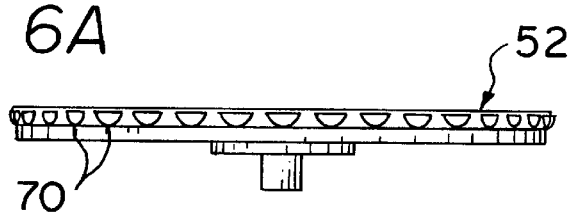
FIGS. 6 and 6A are perspective view and a cross-sectional view, respectively, of a slicer dish useful according to the invention.
Figure 6:
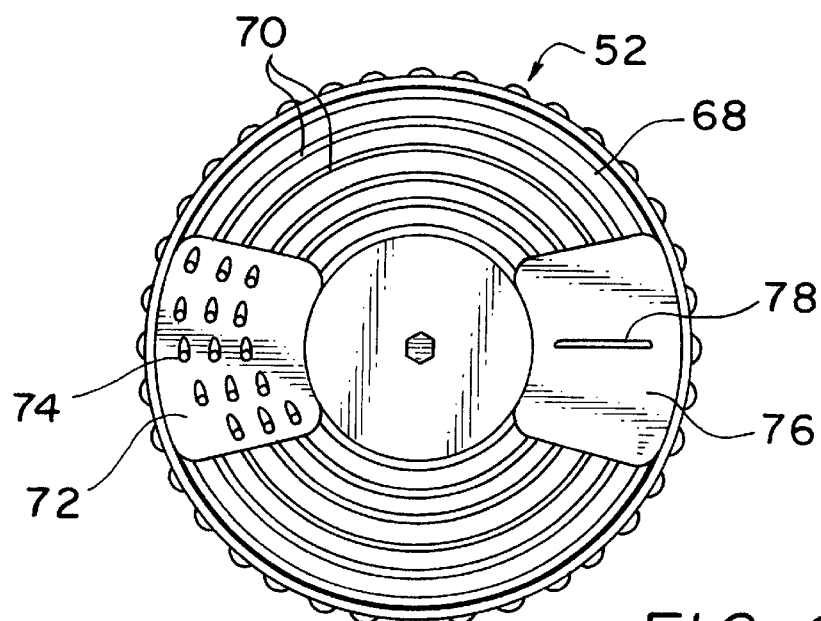

Cover lid 52 can be seen in more detail in FIGS. 6 and 6A where one surface 68 of cover lid 52 may contain protrusions 70. Also, cover lid 52 may contain at least one slicing means. Here, in a preferred embodiment, cover lid 52 comprises slicing section 72 with grating projections 74 and slicing section 76 with slicing slot 78.

Figure 7:
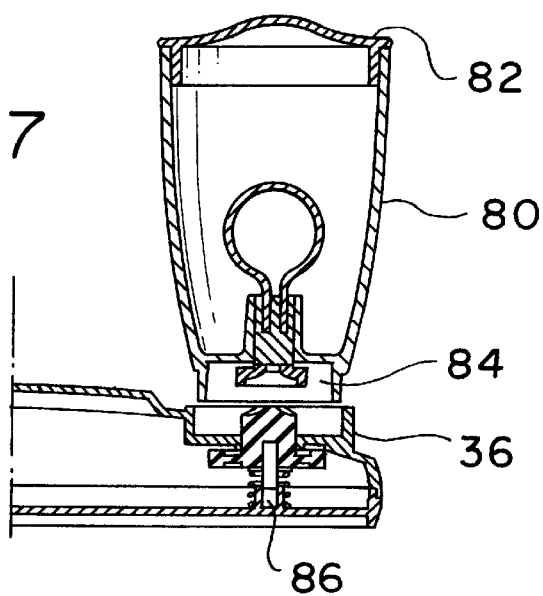
FIG. 7 is a detail showing the configuration of the invention having a salad dressing container.

FIG. 7 represents a typical salad dressing dispenser 80 that may be attached to cover 20 at receptable 36. Dispenser 80 has a removable top 82 and a recess 84 that engages receptable 36. Preferably dispenser 80 and receptable 36 are configured so that salad dressing dispenses through opening 86 into salad spinner 44. Optionally dispenser 80 and/or receptable 36 are mechanically connected to motor 40 so that an agitator 86 is rotated and/or salad dressing is positively dispensed.

It will be further apparent to one skilled in this art that the improvements provided for in the present invention, while described with relation to certain specific physical embodiments also lend themselves to being applied in other physical arrangements not specifically provided for herein, which are nonetheless within the spirit and scope of the invention taught here.

What is claimed is:

1. An electric salad spinner, comprising:
    a generally cylindrical base component having a closed bottom and an open top,
    a mating open top generally cylindrical basket component insertable into the base component, and
    a sealable lid component fitted to the top of the base component, said sealable lid component having a handle assembly comprising a motorized drive assembly with a drive shaft/gear means extending therethrough, such that the drive shaft/gear means of the drive assembly slidingly engages the inner top rim of the cylindrical basket so as to enable the rotation of the cylindrical basket about is axis when the electric motor is activated by depressing an on/off located on the handle assembly.

2. An electric salad spinner according to claim 1, wherein said sealable lid also comprises a sealing port having a sealable closure.

3. An electric salad spinner according to claim 1, which also comprises a slicing blade assembly.

4. An electric salad spinner according to claim 1, which also comprises a liquid dispenser.

5. An electric salad spinner according to claim 4, wherein the liquid dispenser comprises a generally cylindrical shaped container, having a sealable top to receive liquids, a dispensing opening for distributing liquids and an end which matingly engages with the port in the sealable lid.

6. An electric salad spinner according to claim 5, wherein the liquid dispenser also comprises a motorized agitation means for mixing the liquid to be dispensed.

\* \* \* \* \*